(12) United States Patent
Datta et al.

(10) Patent No.: US 12,242,988 B2
(45) Date of Patent: Mar. 4, 2025

(54) INTEGER LINEAR PROGRAMMING BASED GENERATION OF A PERSONALIZED OPTIMAL QUESTIONNAIRE USING A SKILL GRAPH

(71) Applicant: Tata Consultancy Services Limited, Mumbai (IN)

(72) Inventors: Soham Datta, Kolkata (IN); Prabir Mallick, Kolkata (IN); Indrajit Bhattacharya, Kolkata (IN); Sangameshwar Patil, Pune (IN); Girish Palshikar, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 354 days.

(21) Appl. No.: 17/563,246

(22) Filed: Dec. 28, 2021

(65) Prior Publication Data

US 2022/0366351 A1    Nov. 17, 2022

(30) Foreign Application Priority Data

Mar. 31, 2021   (IN) .............................. 202121015335

(51) Int. Cl.
*G06Q 10/0631* (2023.01)
*G06F 40/30* (2020.01)
(Continued)

(52) U.S. Cl.
CPC ..... *G06Q 10/063112* (2013.01); *G06F 40/30* (2020.01); *G06N 5/02* (2013.01); *G06Q 10/1053* (2013.01)

(58) Field of Classification Search
CPC ........ G06Q 10/063112; G06Q 10/1053; G06F 40/30; G06N 5/02
See application file for complete search history.

(56) References Cited

U.S. PATENT DOCUMENTS 10,796,217 B2    10/2020   Wu
2019/0188645 A1*  6/2019   Monasor ............ G06Q 10/1053
(Continued)

FOREIGN PATENT DOCUMENTS

CN    111445200 A        7/2020
EP      2922002 A1 *     9/2015    ....... G06Q 10/06311
(Continued)

OTHER PUBLICATIONS

Qin et al., "DuerQuiz: A Personalized Question Recommender System for Intelligent Job Interview," Applied Data Science Track Paper (2019).

*Primary Examiner* — Brendan S O'Shea
(74) *Attorney, Agent, or Firm* — Finnegan, Henderson, Farabow, Garrett & Dunner, LLP

(57) ABSTRACT

The method and system of the present disclosure facilitate automatic, and in an objective manner, selection of an optimal set of technical questions, from a question bank, personalized for a candidate. This ensures consistent, standardized, efficient and objective interviews that result in high quality recruitment, given the diversity of candidates, complexity of job requirements and interviews are inherently subjective. The state-of-the-art depends on responses so far, to generate on-the-fly questions causing a cognitive load on the interviewer. Also, there is no guarantee on the breadth and depth of concepts assessed in each interview. In the present disclosure, skill graphs are employed to create a semantically rich and detailed characterization of questions in terms of concepts. Optimization formulation uses the skill graph to generate constraints, content balancing and objective functions for selection of questions.

15 Claims, 8 Drawing Sheets

(51) Int. Cl.
*G06N 5/02* (2023.01)
*G06Q 10/1053* (2023.01)

(56) References Cited

U.S. PATENT DOCUMENTS

2021/0233030 A1* 7/2021 Preuss ................... G09B 7/00
2021/0391039 A1* 12/2021 Laszlo .................. G16H 10/20

FOREIGN PATENT DOCUMENTS

JP   2010-61179 A  3/2010
KR  10-2015-0000941  1/2015

* cited by examiner

INTEGER LINEAR PROGRAMMING BASED GENERATION OF A PERSONALIZED OPTIMAL QUESTIONNAIRE USING A SKILL GRAPH

PRIORITY CLAIM

This U.S. patent application claims priority under 35 U.S.C. § 119 to: Indian Patent Application No. 202121015335, filed on 31 Mar. 2021. The entire contents of the aforementioned application are incorporated herein by reference.

TECHNICAL FIELD

The disclosure herein generally relates to the field of computer assisted generation of questionnaire, and, more particularly, to systems and methods for integer linear programming-based generation of a personalized optimal questionnaire using a skill graph.

BACKGROUND

Large multinational Information Technology companies typically hire a large number of employees yearly, sometimes to the order of tens of thousands. Assuming an average interview time of 30 minutes, three interviewers in each interview, four candidates interviewed for every position, and 30,000 candidates were interviewed, 180,000 person-hours may be spent on just conducting interviews in one year. Given the diversity of candidates and complexity of job requirements and considering that interviewing is an inherently human and subjective process, it is a mammoth task to ensure consistent, uniform, efficient and objective interviews that result in high quality recruitment.

SUMMARY

Embodiments of the present disclosure present technological improvements as solutions to one or more of the above-mentioned technical problems recognized by the inventors in conventional systems.

In an aspect, there is provided a processor implemented method comprising the steps of: receiving, via one or more hardware processors, input data comprising: (i) a resume associated with a candidate, the resume comprising a first set of skills, each skill in the first set of skills being associated with a first set of concepts, (ii) a job description comprising a second set of skills, each skill in the second set of skills being associated with a second set of concepts, (iii) a skill graph pertaining to each skill in the second set of skills, wherein each concept in the second set of concepts serves as a node in the skill graph and edges connect each node to a semantically related one or more concepts in the second set of concepts, (iv) a predefined question bank comprising a plurality of questions pertaining to each skill in the second set of skills, each question in the plurality of questions being mapped to (a) one or more concepts from the second set of concepts and (b) an associated difficulty level being one of easy, medium and hard, (v) a difficulty level proportion configured to define number of questions from the predefined question bank corresponding to each difficulty level, (vi) a proficiency level corresponding to each skill in the second set of skills, and (vii) a time budget allotted for an assessment of the candidate; computing, via the one or more hardware processors, a coverage of each question in the predefined question bank as a union of (i) the one or more concepts from the second set of concepts directly mapped to each question in the predefined question bank and (ii) one or more concepts from the second set of concepts that are neighbors, in the skill graph, of the directly mapped one or more concepts, the neighbors being the one or more concepts that are semantically related to each other; generating, via the one or more hardware processors, a question graph corresponding to the predefined question bank, the question graph having vertices corresponding to each question in the predefined question bank and edges connecting a pair of vertices if the corresponding questions share at least one concept from the second set of concepts, thereby representing related questions, while questions from the predefined question bank that do not share a concept represent unrelated questions; computing, via the one or more hardware processors, a coverage of the resume as a union of (i) the first set of concepts and (ii) one or more concepts that are neighbors, in the skill graph, of the concepts from the first set of concepts; computing, via the one or more hardware processors, a coverage of the job description as a union of (i) the second set of concepts and (ii) one or more concepts that are neighbors, in the skill graph of the concepts from the second set of concepts; formulating, via the one or more hardware processors, an objective function to be maximized, the objective function representing a sum of a plurality of additive components subject to one or more constraints; computing, via the one or more hardware processors, a solution to an Integer Linear Programming (ILP) formulation comprising the formulated objective function and the one or more constraints, the solution being in the form a bit array having a size corresponding to a number of questions in the predefined question bank; and generating, via the one or more hardware processors, a personalized optimal questionnaire, for the candidate, the personalized optimal questionnaire comprising an optimal set of questions from the predefined question bank, corresponding to a 1-bit in the bit array, and satisfying one or more criteria, each of the one or more criteria being the additive component of the objective function subject to the one or more constraints.

In another aspect, there is provided a system comprising: one or more data storage devices operatively coupled to one or more hardware processors and configured to store instructions configured for execution via the one or more hardware processors to: receive input data comprising: (i) a resume associated with a candidate, the resume comprising a first set of skills, each skill in the first set of skills being associated with a first set of concepts, (ii) a job description comprising a second set of skills, each skill in the second set of skills being associated with a second set of concepts, (iii) a skill graph pertaining to each skill in the second set of skills, wherein each concept in the second set of concepts serves as a node in the skill graph and edges connect each node to a semantically related one or more concepts in the second set of concepts, (iv) a predefined question bank comprising a plurality of questions pertaining to each skill in the second set of skills, each question in the plurality of questions being mapped to (a) one or more concepts from the second set of concepts and (b) an associated difficulty level being one of easy, medium and hard, (v) a difficulty level proportion configured to define number of questions from the predefined question bank corresponding to each difficulty level, (vi) a proficiency level corresponding to each skill in the second set of skills, and (vii) a time budget allotted for an assessment of the candidate; compute a coverage of each question in the predefined question bank as a union of (i) the one or more concepts from the second set of concepts directly mapped to each question in the predefined question bank and (ii) one or more concepts from the second set of concepts that are neighbors, in the skill graph, of the directly mapped one or more concepts, the neighbors being the one or more concepts that are semantically related to each other; generate a question graph corresponding to the predefined question bank, the question graph having vertices corresponding to each question in the predefined question bank and edges connecting a pair of vertices if the corresponding questions share at least one concept from the second set of concepts, thereby representing related questions, while questions from the predefined question bank that do not share a concept represent unrelated questions; compute a coverage of the resume as a union of (i) the first set of concepts and (ii) one or more concepts that are neighbors, in the skill graph, of the concepts from the first set of concepts; compute a coverage of the job description as a union of (i) the second set of concepts and (ii) one or more concepts that are neighbors, in the skill graph of the concepts from the second set of concepts; formulate an objective function to be maximized, the objective function representing a sum of a plurality of additive components subject to one or more constraints; compute a solution to an Integer Linear Programming (ILP) formulation comprising the formulated objective function and the one or more constraints, the solution being in the form a bit array having a size corresponding to a number of questions in the predefined question bank; and generate a personalized optimal questionnaire, for the candidate, the personalized optimal questionnaire comprising an optimal set of questions from the predefined question bank, corresponding to a 1-bit in the bit array, and satisfying one or more criteria, each of the one or more criteria being the additive component of the objective function subject to the one or more constraints.

In yet another aspect, there is provided a computer program product comprising a non-transitory computer readable medium having a computer readable program embodied therein, wherein the computer readable program, when executed on a computing device, causes the computing device to: receive input data comprising: (i) a resume associated with a candidate, the resume comprising a first set of skills, each skill in the first set of skills being associated with a first set of concepts, (ii) a job description comprising a second set of skills, each skill in the second set of skills being associated with a second set of concepts, (iii) a skill graph pertaining to each skill in the second set of skills, wherein each concept in the second set of concepts serves as a node in the skill graph and edges connect each node to a semantically related one or more concepts in the second set of concepts, (iv) a predefined question bank comprising a plurality of questions pertaining to each skill in the second set of skills, each question in the plurality of questions being mapped to (a) one or more concepts from the second set of concepts and (b) an associated difficulty level being one of easy, medium and hard, (v) a difficulty level proportion configured to define number of questions from the predefined question bank corresponding to each difficulty level, (vi) a proficiency level corresponding to each skill in the second set of skills, and (vii) a time budget allotted for an assessment of the candidate; compute a coverage of each question in the predefined question bank as a union of (i) the one or more concepts from the second set of concepts directly mapped to each question in the predefined question bank and (ii) one or more concepts from the second set of concepts that are neighbors, in the skill graph, of the directly mapped one or more concepts, the neighbors being the one or more concepts that are semantically related to each other; generate a question graph corresponding to the predefined question bank, the question graph having vertices corresponding to each question in the predefined question bank and edges connecting a pair of vertices if the corresponding questions share at least one concept from the second set of concepts, thereby representing related questions, while questions from the predefined question bank that do not share a concept represent unrelated questions; compute a coverage of the resume as a union of (i) the first set of concepts and (ii) one or more concepts that are neighbors, in the skill graph, of the concepts from the first set of concepts; compute a coverage of the job description as a union of (i) the second set of concepts and (ii) one or more concepts that are neighbors, in the skill graph of the concepts from the second set of concepts; formulate an objective function to be maximized, the objective function representing a sum of a plurality of additive components subject to one or more constraints; compute a solution to an Integer Linear Programming (ILP) formulation comprising the formulated objective function and the one or more constraints, the solution being in the form a bit array having a size corresponding to a number of questions in the predefined question bank; and generate a personalized optimal questionnaire, for the candidate, the personalized optimal questionnaire comprising an optimal set of questions from the predefined question bank, corresponding to a 1-bit in the bit array, and satisfying one or more criteria, each of the one or more criteria being the additive component of the objective function subject to the one or more constraints.

In accordance with an embodiment of the present disclosure, the one or more hardware processors are configured to formulate the objective function to be maximized by: formulating an additive component $f_1$ from the plurality of additive components, the additive component $f_1$ being configured to select questions from the predefined question bank having a maximum coverage of the concepts in the second set of concepts; formulating an additive component $f_2$ from the plurality of additive components, the additive component $f_2$ being configured to select the related questions in the question graph; formulating an additive component $f_3$ from the plurality of additive components, the additive component $f_3$ being configured to select the unrelated questions in the question graph; formulating an additive component $f_4$ from the plurality of additive components, the additive component $f_4$ being configured to select questions having a coverage that shares one or more concepts in the first set of concepts by comparing the coverage of each question in the predefined question bank with the coverage of the resume; formulating an additive component $f_5$ from the plurality of additive components, the additive component $f_5$ being configured to select questions having a coverage that shares one or more concepts in the second set of concepts by comparing the coverage of each question in the predefined question bank with the coverage of the job description; formulating a constraint C1 configured to select questions such that time taken for responding to the personalized optimal questionnaire is less than or equal to the time budget allotted for the assessment; formulating a constraint C2 configured to select number of questions associated with the difficulty level being easy, medium and hard, based on the difficulty level proportion; and formulating a constraint C3, configured to select the number of questions, from the predefined question bank corresponding to each difficulty level on the proficiency level.

In accordance with an embodiment of the present disclosure, the additive component $f_1$ is represented as: $f_1$: $\Sigma_{i=1}^{|Q|} x_i \cdot |\psi(q_i)|$, with $\Psi(q_i)$ representing the coverage of a question $q_i$, $|Q|$ representing number of questions, pertaining to a skill, in the predefined question bank, and $x_i$ is a set of Boolean variables corresponding to an $i^{th}$ question, where $1 \leq i \leq |Q|$; the additive component $f_2$ is represented as: $f_2: \Sigma_{i=1}^{|Q|} \Sigma_{j>i}^{|Q|} x_i \cdot x_j \cdot \text{is\_qgraph\_edge}(i,j)$, with $x_j$ is a set of Boolean variables corresponding to a $j^{th}$ question, $x_i$ representing a set of Boolean variables corresponding to an $i^{th}$ question, and qgraph_edge representing a function that returns a value 1 in the presence of an edge between the $i^{th}$ question and the $j^{th}$ question in the question graph; the additive component $f_3$ is represented as: $f_3$: $\Sigma_{i=1}^{|Q|} \Sigma_{j>i}^{|Q|} x_i \cdot x_j \cdot \neg \text{is\_qgraph\_path}(x_i, x_j)$, with $x_i$ representing a set of Boolean variables corresponding to an $i^{th}$ question, $x_j$ representing a set of Boolean variables corresponding to a $j^{th}$ question, and is_qgraph_path representing a function that returns a value 1 in the presence of a path between the $i^{th}$ question and the $j^{th}$ question in the question graph; the additive component $f_4$ is represented as: $f_4$: $\Sigma_{i=1}^{|Q|} x_i \cdot (\psi(q_i) \cap \Phi(W_R) \neq \emptyset)$, with $x_i$ representing a set of Boolean variables corresponding to an $i^{th}$ question, $W_R$ representing the first set of concepts and $\Phi(W_R)$ representing the coverage of the resume; the additive component $f_5$ is represented as: $f_5$: $\Sigma_{i=1}^{|Q|} x_i \cdot (\psi(q_i) \cap \Phi(W_j) \neq \emptyset)$, with $x_i$ representing a set of Boolean variables corresponding to an $i^{th}$ question, $W_j$ representing the second set of concepts and $\Phi(W_j)$ representing the coverage of the job description; the constraint C1 is represented as: C1: $\Sigma_{i=1}^{|Q|} x_i \cdot T_{\delta(q_i)} (q_i) \leq T$, with $x_i$ representing a set of Boolean variables corresponding to an $i^{th}$ question, $\delta(q_i)$ representing the difficulty level associated with the question $q_i$, $T_{\delta(q_i)}$ representing time taken for responding to the question $q_i$ and T representing the time budget allotted for the assessment; the constraint C2 is represented as: C2(k): $\Sigma_{i=1}^{|Q|} x_i \cdot (\delta(q_i) == k) \leq (m_k \cdot (\Sigma_{i=1}^{|Q|} x_i)$ with $x_i$ representing a set of Boolean variables corresponding to an $i^{th}$ question, k representing the difficulty level and $m_k$ representing the difficulty level proportion; and the constraint C3 is represented as: C3: $\Sigma_{i=1}^{|Q|} x_i \cdot \delta(q_i) \geq h_0 \cdot \Sigma_{i=1}^{|Q|} x_i$, with $x_i$ representing a set of Boolean variables corresponding to an $i^{th}$ question and $h_0$ representing the proficiency level.

In accordance with an embodiment of the present disclosure, the one or more hardware processors are configured to formulate an additive component $f_4^d$ from the plurality of additive components, the additive component $f_4^d$ being configured to select questions directly mapped to the first set of concepts; and formulate an additive component $f_5^d$ from the plurality of additive components, the additive component $f_5^d$ being configured to select questions that directly map to the second set of concepts.

In accordance with an embodiment of the present disclosure, the additive component $f_4^d$ is represented as: $f_4^d$: $\Sigma_{i=1}^{|Q|} x_i \cdot (\psi_0(q_i) \cap (Q_R) \neq \emptyset)$, with $x_i$ representing a set of Boolean variables corresponding to an $i^{th}$ question, $\psi_0(q_i)$ represents concepts directly related to the questions; and the additive component $f_5^d$ is represented as: $f_5^d$: $\Sigma_{i=1}^{|Q|} x_i \cdot (\psi_0(q_i) \cap (W_j) \neq \emptyset)$, with $x_i$ representing a set of Boolean variables corresponding to an $i^{th}$ question.

In accordance with an embodiment of the present disclosure, the objective function to be maximized is a weighted sum of a plurality of additive components subject to one or more constraints, wherein weights associated with one or more of the plurality of additive components are configured to change relative importance associated with a corresponding additive component.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
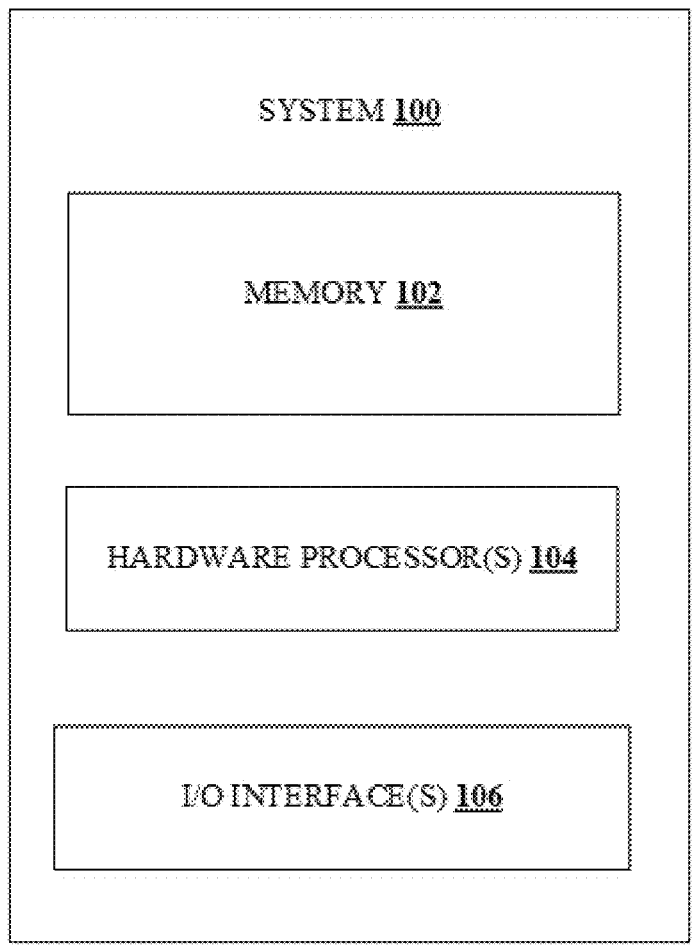
FIG. 1 illustrates an exemplary block diagram of a system for integer linear programming-based generation of a personalized optimal questionnaire using a skill graph, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Given the diversity of candidates and complexity of job requirements; and since interviewing is an inherently subjective process, it is an important task to ensure consistent, uniform, efficient and objective interviews that result in high quality recruitment. The method and system of the present disclosure facilitate automatic, and in an objective manner, selection of an optimal set of technical questions (from question banks) personalized for a candidate. This set helps an interviewer to plan for an upcoming interview of the candidate.

In the field of Computerized Adaptive Testing (CAT), the task involved selects questions (also called items) on-the-fly from a question bank, depending on how the student has answered the questions so far (i.e., adjusting to her/his ability level). CAT techniques are used in large-scale general online examinations. Students are anonymous in CAT, whereas interviewers have detailed knowledge about the candidate, for instance, through the Curriculum Vitae (CV) or resume. CAT is about a dynamically assembled, personalized, ordered sequence of questions which are dependent on the student's answers so far, whereas in the present disclosure, a static one-time selection of interview questions customized to cater to the breadth and depth of the resume is addressed. Skill graphs have been employed to create a semantically rich and detailed characterization of questions in terms of concepts. The optimization formulation uses the skill graph to generate constraints (including content balancing) and objective functions for selection of questions. Duerquiz (Qin et al. 2019) recommends a set of questions from a question bank using a skill graph given the job description, resumes of candidates, but unlike the present disclosure, does not consider the difficulty level associated with questions, or question graph. Also, the skill graph used in the prior art is generated using historical recruitment data. The state-of-the-art method can therefore not be used in the absence of historical recruitment data. Also, the state-of-the-art skill graph may not include necessary skills, if they are not part of the historical recruitment data.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

FIG. 1 illustrates an exemplary block diagram of a system 100 for integer linear programming-based generation of a personalized optimal questionnaire using a skill graph, in accordance with some embodiments of the present disclosure. In an embodiment, the system 100 includes one or more hardware processors 104, communication interface device(s) or input/output (I/O) interface(s) 106, and one or more data storage devices or memory 102 operatively coupled to the one or more hardware processors 104. The one or more hardware processors 104 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, handheld devices, workstations mainframe computers, servers, a network cloud and the like.

I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connect g a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
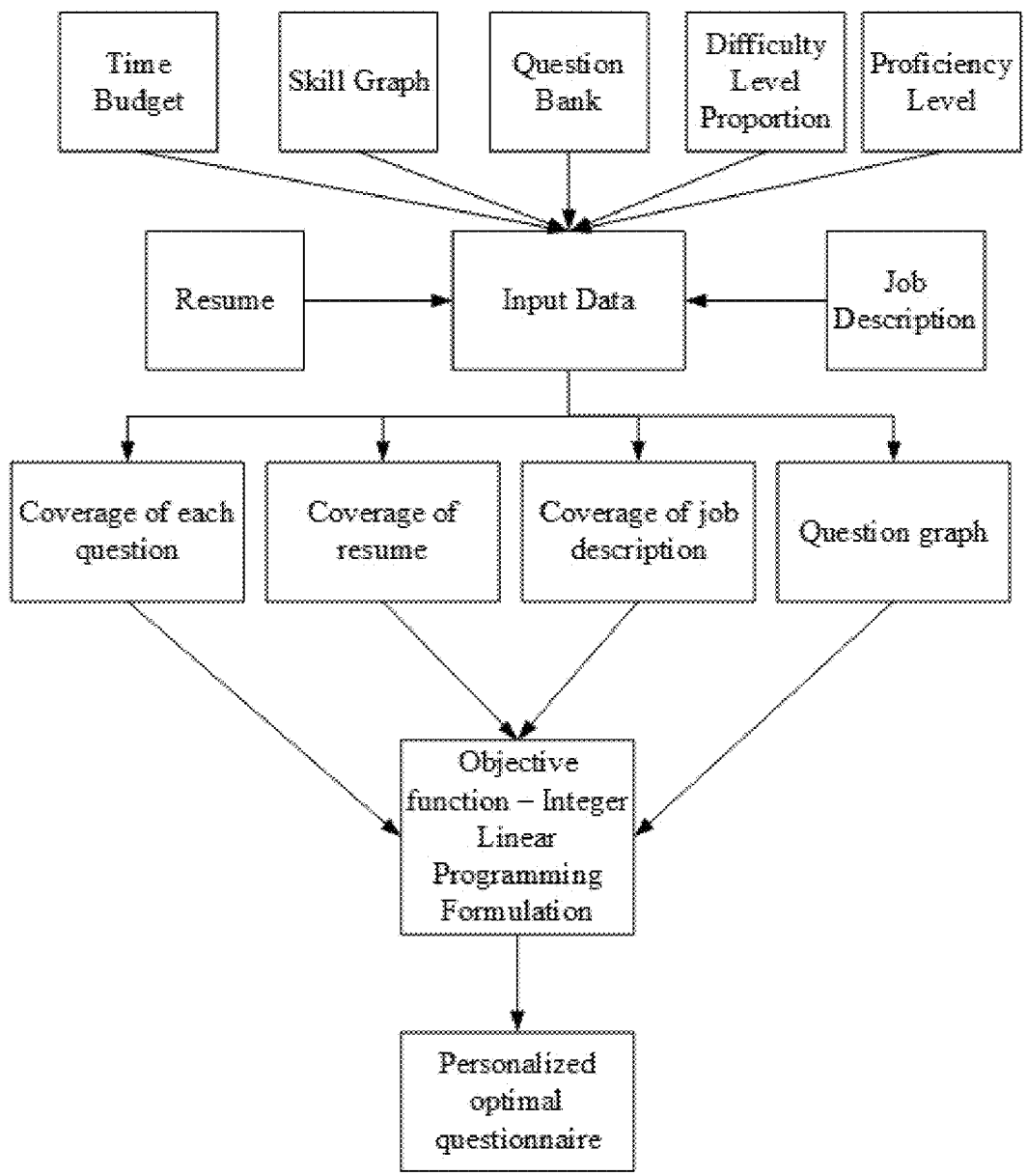
FIG. 2 illustrates an exemplary functional flow diagram of a method for integer linear programming-based generation of a personalized optimal questionnaire using a skill graph, in accordance with some embodiments of the present disclosure.
Figure 3A:
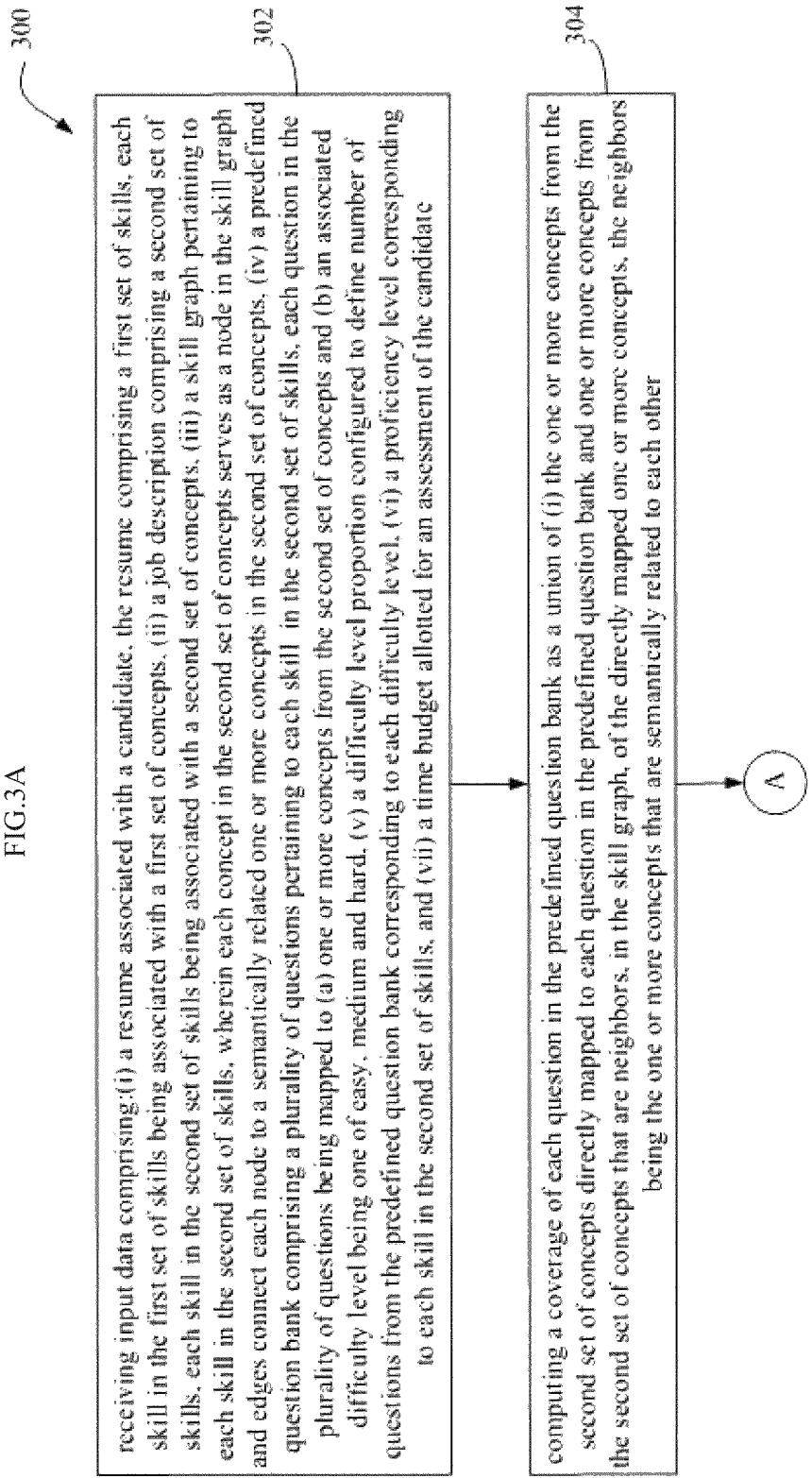
FIG. 3A through FIG. 3C illustrates an exemplary flow diagram of a computer implemented method for integer linear programming-based generation of a personalized optimal questionnaire using a skill graph, in accordance with some embodiments of the present disclosure.
Figure 3B:
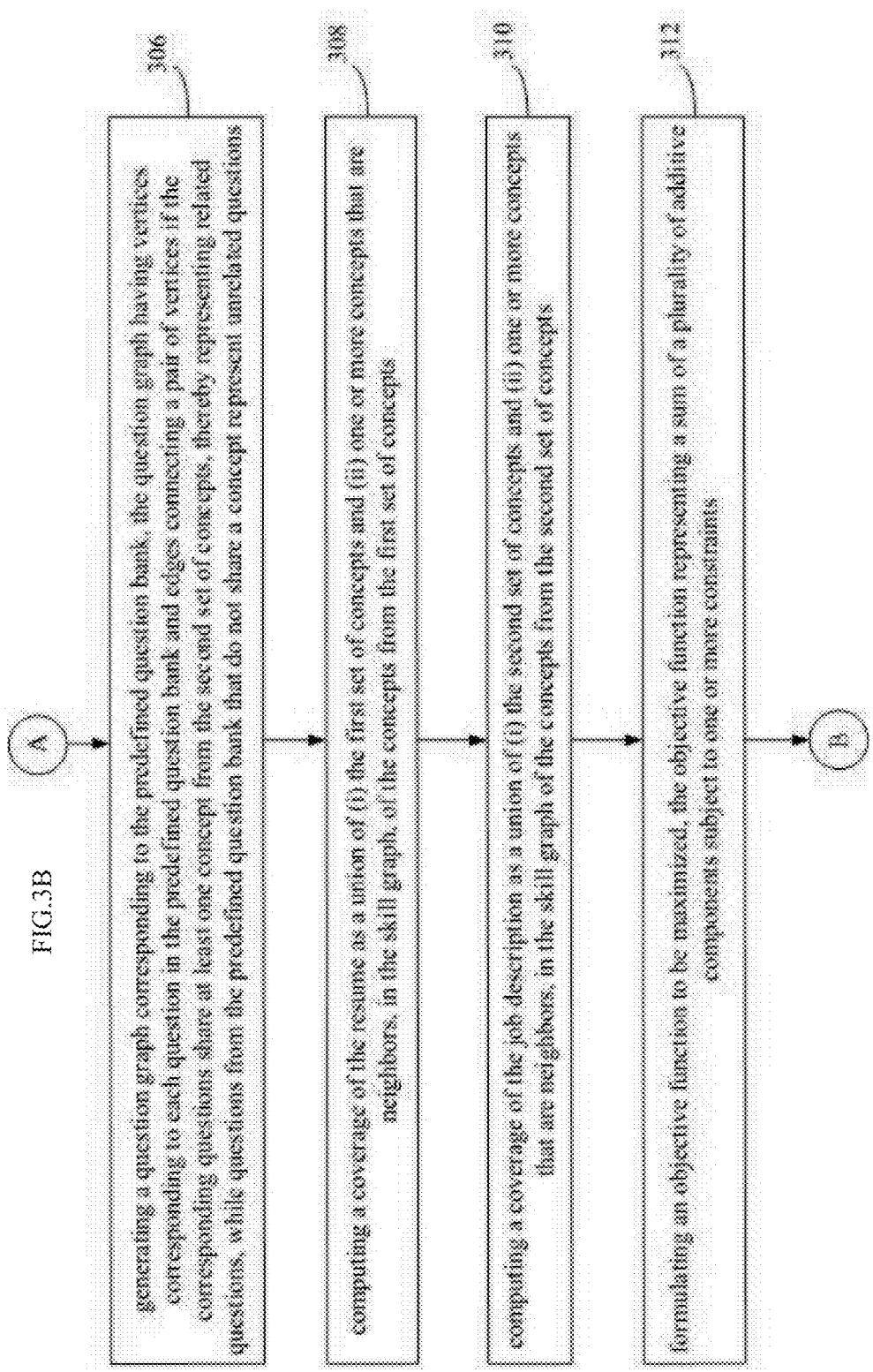
Figure 3C:
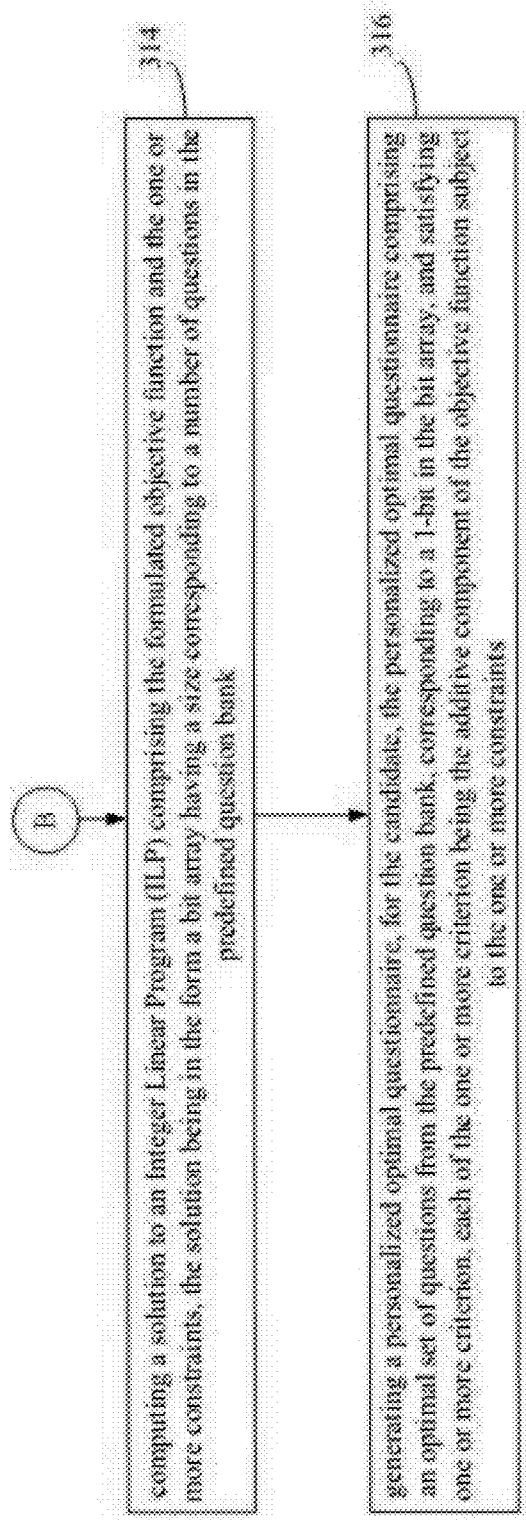

FIG. 2 illustrates an exemplary functional flow diagram of a method for integer linear programming-based generation of a personalized optimal questionnaire using a skill graph while FIG. 3A through FIG. 3C illustrate an exemplary flow diagram of a computer implemented method 300 for integer linear programming-based generation of a personalized optimal questionnaire using a skill graph, in accordance with some embodiments of the present disclosure. In an embodiment, the system 100 includes one or more data storage devices or memory 102 operatively coupled to the one or more hardware processors 104 and is configured to store instructions configured for execution of steps of the method 300 by the one or more hardware processors 104. The steps of the method 300 will now be explained in detail with reference to the components of the system 100 of FIG. 1 and the functional flow diagram of FIG. 2 with further reference to FIG. 4 and FIG. 5. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

During an assessment, say an interview, technical questions that explore the breadth and depth of the candidate's understanding of a particular technical skill need to be addressed. Given a candidate resume, a technical skill and a question bank about that skill, the task addressed by the present disclosure is how to select the "best" set of questions from the question bank that maximize some objective functions and meet required constraints. The selected "best" set of questions need to be personalized for the candidate, in the sense the set of questions need to be closely related to the candidate's background mentioned in the resume. Accordingly, in an embodiment of the present disclosure, the one or more hardware processors 104, are configured to receive, at step 302, input data comprising (i) a resume associated with a candidate, (ii) a job description, (iii) a skill graph, (iv) a predefined question bank, (v) a difficulty level proportion, (vi) a proficiency level, and (vii) a time budget allotted for an assessment of the candidate. In an embodiment, the assessment may be in the form of an interview or a written test.

The resume comprises a first set of skills, each skill being associated with a first set of concepts. Likewise, the job description comprises a second set of skills, each skill in the second set of skills being associated with a second set of concepts. It may be understood that the first set of skills and the second set of skills are not disjoint. A skill is a subject in the technical domain. For example, Machine learning, Java™, Python™, etc. are skills in Computer science domain. A concept is a topic associated with a skill. For example, linear regression is a concept associated with the skill Machine learning, Object-oriented programming is a concept associated with the skill Java™. The examples in the present disclosure are mainly related to the skill Machine learning, merely for ease of explanation. It may be noted by those skilled in the art that the method 300 is applicable to any skill in the technical domain.

The skill graph, in accordance with the present disclosure, pertains to each skill in the second set of skills, wherein each concept in the second set of concepts serves as a node in the skill graph and edges connect each node to a semantically related one or more concepts in the second set of concepts. The skill graph of the present disclosure received as an input data is built from public knowledge graphs such as DBPedia and WikiData which already contain a lot of knowledge about many skills. But being open-domain, only a small subset is relevant for a skill. Given such a larger knowledge graph, in accordance with the present disclosure, the skill graph is identified as a sub-graph of the larger knowledge graph. To aid in this task, a set of positive seed concepts for the skill are identified. This includes the concepts corresponding to the skill itself, e.g. Machine Learning, and additional concepts. A natural source for positive seeds is the syllabi and lecture schedules of open courses (e.g. MIT Open course ware). The output is a skill specific Knowledge Graph or a skill graph. To address this, the state-of-the-art (CRUMBTRAIL) is used. However, CRUMBTRAIL only considers strict-weak-order relations such as category hierarchy, and further, in the generated graph, the positive seed concepts are the only leaf concepts. This is an issue when working with a syllabus, since these are not specific enough and do not cover all leaves of the desired skill graph. Therefore, an initializer stage is run before invoking the CRUMBTRAIL as a pruner. The positive seeds then contain both leaf concepts and intermediate concepts from the category hierarchy in the larger knowledge graph. The initializer augments with concepts from the vertices of the larger knowledge graph that are at most k-hops away from the category hierarchy in the graph. An augmented positive seed set along with the larger knowledge graph is provided as input to the CRUMBTRAIL. This algorithm climbs bottom-up, traversing concepts from the leaf concepts to a layer containing the intermediate concepts, searching paths that connect the intermediate concepts to the leaf concepts. It then unifies these paths to construct the skill graph. However, the edge set of the skill graph now contains only the category hierarchy relations. Further post processing is done by adding to the set relations of other types from the larger knowledge graph between the concepts already in the vertex set of the skill graph.

Figure 4:
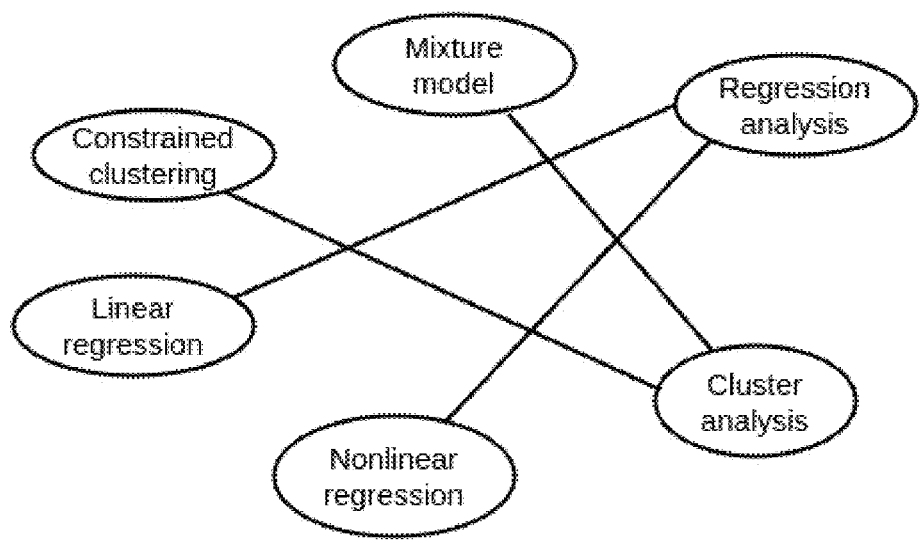
FIG. 4 illustrates a portion of a skill graph for an exemplary skill, machine learning, in accordance with some embodiments of the present disclosure.

FIG. 4 illustrates a portion of a skill graph for the exemplary skill, machine learning, in accordance with some embodiments of the present disclosure. The nodes in the skill graph are some of the concepts associated with the skill, machine learning and edges exist between two related concepts, for instance, regression analysis has edges with linear regression and nonlinear regression, or cluster analysis has edges with constrained clustering and mixture model. Neighborhood of a concept is a set of concepts directly connected to the concept in the skill graph along with the concept itself. For example, in FIG. 4, neighborhood of Regression analysis consists of three nodes {Regression analysis, Linear regression, Nonlinear regression}. Therefore, size of the neighborhood is 3.

The predefined question bank comprises a plurality of questions pertaining to each skill in the second set of skills, wherein each question in the plurality of questions is mapped to (a) one or more concepts from the second set of concepts and (b) an associated difficulty level being one of easy, medium and hard. An exemplary question bank is as shown in Table 1 below.

TABLE 1

| No. | Question | Concept(s) | Difficulty level |
|---|---|---|---|
| 1 | What is clustering? | Cluster analysis | Easy |
| 2 | What is a random forest? | Random forest | Medium |
| 3 | What is the main difference between PCA and ICA? | Independent component analysis, Principal component analysis | Medium |

TABLE 1-continued

| No. | Question | Concept(s) | Difficulty level |
|---|---|---|---|
| 4 | Explain the advantages and drawbacks of support vector machines (SVM). | Support vector machine | Medium |
| 5 | How do you train neural networks? | Artificial neural network | Easy |
| 6 | When you have sparse data, which regression do you use and why? | Regression analysis | Hard |
| 7 | What are the evaluation metrics for regression? | Regression analysis | Medium |
| 8 | Explain how a system can play a game of chess using reinforcement learning. | Reinforcement learning | Hard |
| 9 | How do you define optimal number of clusters? | Cluster analysis | Hard |
| 10 | What is the difference between machine learning and deep learning | Machine learning, Deep learning | Easy |

The difficulty level proportion, in accordance with the present disclosure, is configured to define number of questions from the predefined question bank corresponding to each difficulty level. The time taken to answer a question depends upon the difficulty level of the question. It is assumed that an easy question takes ~1 minute to answer, a medium question takes ~2 minutes and a hard question takes ~3 minutes. The proficiency level received as part of the input data corresponds to an expected expertise the candidate must have for each skill in the second set of skills.

Coverage of a question is the set of concepts associated with it, along with their neighborhoods. In an embodiment of the present disclosure, the one or more hardware processors 104, are configured to compute, at step 304, a coverage of each question in the predefined question bank as a union of (i) the one or more concepts from the second set of concepts directly mapped to each question in the predefined question bank and (ii) one or more concepts from the second set of concepts that are neighbors, in the skill graph, of the directly mapped one or more concepts, the neighbors being the one or more concepts that are semantically related to each other.

For the seventh question in the question bank, 'What are the evaluation metrics for regression?', the associated concept is 'Regression analysis', so according to the skill graph in FIG. 4, the coverage is {Regression analysis, Linear regression, Nonlinear regression}. For a question with more than one associated concept, the coverage will be the union of the concepts along with their neighborhoods.

Figure 5:
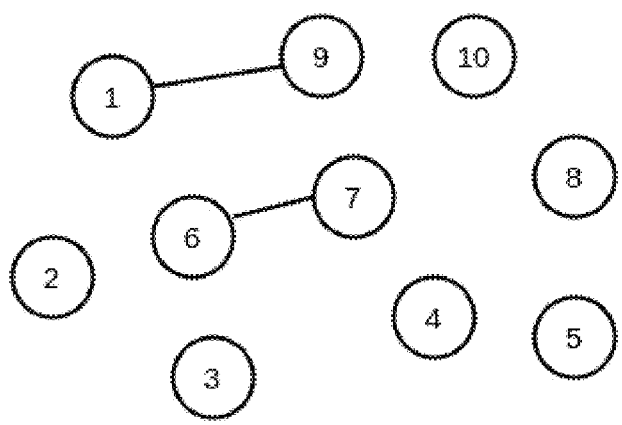
FIG. 5 illustrates a portion of a question graph for a set of exemplary questions pertaining to the exemplary skill machine learning, in accordance with some embodiments of the present disclosure.

To get related questions a question graph is generated using the questions in the question bank. In the question graph, any two questions with a common concept is connected by an edge. For instance, the questions 6 and 7 in the question back of Table 1 share an edge because of the common concept 'Regression analysis'. In an embodiment of the present disclosure, the one or more hardware processors 104, are configured to generate, at step 306, a question graph corresponding to the predefined question bank, the question graph having vertices corresponding to each question in the predefined question bank and edges connecting a pair of vertices if the corresponding questions share at least one concept from the second set of concepts, thereby representing related questions, while questions from the predefined question bank that do not share a concept represent unrelated questions. FIG. 5 illustrates a portion of a question graph for a set of exemplary questions pertaining to the exemplary skill machine learning, in accordance with some embodiments of the present disclosure. The numbers in the circles represent vertices corresponding to the question numbers in Table 1 above and an edge exists between two questions if there is at least one common concept like between questions 1 and 9 that share the common concept of 'Cluster analysis'.

In an embodiment of the present disclosure, the one or more hardware processors 104, are configured to compute, at step 308, a coverage of the resume as a union of (i) the first set of concepts and (ii) one or more concepts that are neighbors, in the skill graph, of the concepts from the first set of concepts.

In an embodiment of the present disclosure, the one or more hardware processors 104, are configured to compute, at step 310, a coverage of the job description as a union of (i) the second set of concepts and (ii) one or more concepts that are neighbors, in the skill graph of the concepts from the second set of concepts.

In an embodiment of the present disclosure, the one or more hardware processors 104, are configured to formulate, at step 312, an objective function to be maximized, the objective function representing a sum of a plurality of additive components subject to one or more constraints.

In an embodiment of the present disclosure, the step of formulating an objective function to be maximized comprises formulating a plurality of additive components ($f_1, f_2, f_3, f_4, f_5$) and a plurality of constraints (C1, C2 and C3) as explained hereinafter.

In an embodiment, the additive component $f_1$ is configured to select questions from the predefined question bank having a maximum coverage of the concepts in the second set of concepts and is represented as:

$$f_1: \sum_{i=1}^{|Q|} x_i \cdot |\psi(q_i)|,$$

with $\Psi(q_i)$ representing the coverage of a question $q_i$, $|Q|$ representing number of questions, pertaining to a skill, in the predefined question bank, and $x_i$ is a set of Boolean variables corresponding to an $i^{th}$ question, where $1 \leq i \leq |Q|$.

Table 2 below provides a recommended set of questions, from the exemplary question bank of Table 1, obtained using the additive component $f_1$.

TABLE 2

| No. | Question | Concept(s) | Difficulty level |
|---|---|---|---|
| 1 | What is clustering? | Cluster analysis | Easy |
| 2 | How do you train neural networks? | Artificial neural network | Easy |
| 3 | When you have sparse data, which regression do you use and why? | Regression analysis | Hard |
| 4 | What are the evaluation metrics for regression? | Regression analysis | Medium |
| 5 | How do you define optimal number of clusters? | Cluster analysis | Hard |
| 6 | What is the difference between machine learning and deep learning | Machine learning, Deep learning | Easy |

The questions 1, 3, 4, and 5 in Table 2 are about 'Cluster analysis' and 'Regression analysis' and their large coverage size may be attributed to the dense neighborhood of these concepts in the skill graph.

Questions asked in an interview are often related to an earlier question, indicating exploration of the depth of a candidate's knowledge. This is obtained by selecting questions which are directly connected in the question graph. Accordingly, in an embodiment, the additive component $f_2$ is configured to select the related questions in the question graph and is represented as:

$$f_2: \sum_{i=1}^{|Q|} \sum_{j>i}^{|Q|} x_i \cdot x_j \cdot \text{is\_qgraph\_edge}(i, j),$$

with $x_j$ is a set of Boolean variables corresponding to a $j^{th}$ question, $x_i$ representing a set of Boolean variables corresponding to an $i^{th}$ question, and qgraph_edge representing a function that returns a value 1 in the presence of an edge between the $i^{th}$ question and the $j^{th}$ question in the question graph. In the Table 2 above, questions 3 and 4 are related because they share a common concept, 'Regression analysis'.

Questions asked in an interview are often unrelated to an earlier question, indicating exploration of the breadth of a candidate's knowledge. This is obtained by selecting questions which are unrelated, i.e. do not have a path in the question bank. Accordingly, in an embodiment, the additive component $f_3$ is configured to select the unrelated questions in the question graph and is represented as:

$$f_3: \sum_{i=1}^{|Q|} \sum_{j>i}^{|Q|} x_i \cdot x_j \cdot \neg \text{ is\_qgraph\_edge}(x_i, x_j).$$

with $x_i$ representing a set of Boolean variables corresponding to an $i^{th}$ question, $x_j$ representing a set of Boolean variables corresponding to a $j^{th}$ question, and is_qgraph_path representing a function that returns a value 1 in the presence of a path between the $i^{th}$ question and the $j^{th}$ question in the question graph. In the Table 2 above, question 1 is unrelated to question 2 or question 3.

Questions asked in an interview are mostly about concepts mentioned in the candidate's resume or about concepts related to them. This is obtained by selecting questions whose coverage shares some concepts with the resume concepts coverage. Accordingly, in an embodiment, the additive component $f_4$ is configured to select questions having a coverage that shares one or more concepts in the first set of concepts by comparing the coverage of each question in the predefined question bank with the coverage of the resume and is represented as:

$$f_4: \sum_{i=1}^{|Q|} x_i \cdot (\psi(q_i) \cap \Phi(W_R) \neq \emptyset),$$

with $x_i$ representing a set of Boolean variables corresponding to an $i^{th}$ question, $W_R$ representing the first set of concepts and $\phi(W_R)$ representing the coverage of the resume. In the Table 2 above, all the questions except question 6, are related to the candidate's resume concepts.

Similarly, questions asked in an interview are also mostly about concepts mentioned in the job description or about concepts related to them. This is obtained by selecting questions whose coverage shares some concepts with the job description concepts coverage. Accordingly, in an embodiment, the additive component $f_5$ is configured to select questions having a coverage that shares one or more concepts in the second set of concepts by comparing the coverage of each question in the predefined question bank with the coverage of the job description and is represented as:

$$f_5: \sum_{i=1}^{|Q|} x_i \cdot (\psi(q_i) \cap \Phi(W_J) \neq \emptyset),$$

with $x_i$ representing a set of Boolean variables corresponding to an $i^{th}$ question, $W_j$ representing the second set of concepts and $\phi(W_j)$ representing the coverage of the job description. In the Table 2 above, question 6 is related to the job description concept.

The objective function also needs to take into account certain constraints. Given a time budget allotted for an assessment of the candidate, the total time taken to answer all the questions in the optimal questionnaire needs to be less than the time budget allotted. In the Table 2, it may be noted that there are 3 easy questions, 2 hard questions and 1 question with medium difficulty. As mentioned above, it is assumed that the easy, medium and hard questions take 1, 2, and 3 minutes respectively, to respond. Thus, the total time to answer these questions is 12, which is less than the time budget allotted which is 15 mins (say). It may be noted that the time taken to ask a question is ignored here. Accordingly, in an embodiment, the constraint C1 is configured to select questions such that time taken for responding to the personalized optimal questionnaire is less than or equal to the time budget allotted for the assessment and is represented as:

$$C1: \sum_{i=1}^{|Q|} x_i \cdot T_{\delta(q_i)}(q_i) \leq T,$$

with $x_i$ representing a set of Boolean variables corresponding to an $i_{th}$ question, $\delta(q_i)$ representing the difficulty level associated with the question $q_i$, $T_{\delta(q_i)}$ representing time taken for responding to the question $q_i$ and T representing the time budget allotted for the assessment.

The difficulty level distribution of the questions in the optimal questionnaire needs to follow the user specified distribution. The number of easy, medium or hard questions needs to be less than or equal to the difficulty level proportion of easy, medium and hard questions specified in the input data. Here, the questions follow the user-specified difficulty level proportion, say 0.5 for easy questions, 0.33 for hard questions and 0.2 for medium questions. Accordingly, in an embodiment, the constraint C2 is configured to select number of questions associated with the difficulty level being easy, medium and hard, based on the difficulty level proportion and is represented as:

$$C2(k): \sum_{i=1}^{|Q|} x_i \cdot (\delta(q_i) == k) \leq \left( m_k \cdot \left( \sum_{i=1}^{|Q|} x_i \right) \right),$$

with $x_i$, representing a set of Boolean variables corresponding to an $i^{th}$ question, k representing the difficulty level and $m_k$ representing the difficulty level proportion.

Based on the proficiency level that a candidate has in a given skill, as received as part of the input data, the difficulty level of selected questions is required to be adjected. For example, a candidate with high proficiency level may be asked fairly difficult questions. This provides another constraint, which states that the average difficulty level of selected questions should be above a user-specified constant and may be derived from the proficiency level of the candidate in a skill. Here, if it is assumed that 'easy' is 0, 'medium' is 1, 'hard' is 2, then the average difficulty level of the questions in Table 2 is 0.83 which is greater than the received proficiency level, 0.8 (say). Accordingly, in an embodiment, the constraint C3 is configured to select the number of questions, from the predefined question bank corresponding to each difficulty level on the proficiency level and is represented as;

$$C3: \sum_{i=1}^{|Q|} x_i \cdot \delta(q_i) \geq h_0 \cdot \sum_{i=1}^{|Q|} x_i,$$

with $x_i$ representing a set of Boolean variables corresponding to an $i^{th}$ question and $h_0$ representing the proficiency level.

Considering all the requirements mentioned above, the method 300 selects a fixed set of questions for the candidate before an assessment, as shown in Table 2. Although a reasonable assessment must include questions related to as many concepts in the neighborhood of the concepts in the resume, it may be sometimes needed to refine this objective to specifically consider questions directly related to the concepts in the resume. Accordingly in an embodiment of the present disclosure, to increase selection of questions directly mapped to the concepts in the resume, an additional additive component $f_4^d$ configured to select questions directly mapped to the first set of concepts may be formulated. The additive component $f_4^d$ may be represented as:

$$f_4^d: \sum_{i=1}^{|Q|} x_i \cdot (\psi_0(q_i) \cap (W_R) \neq \emptyset),$$

with $x_i$ representing a set of Boolean variables corresponding to an $i^{th}$ question, $\psi_0(q_i)$ represents concepts directly related to the questions.

Likewise, a reasonable assessment must also include questions related to as many concepts in the neighborhood of the concepts in the job description. Accordingly, in an embodiment of the present disclosure, to increase selection of questions directly mapped to the concepts in the job description, an additional additive component $f_5^d$ configured to select questions directly mapped to the second set of concepts may be formulated. The additive component $f_5^d$ may be represented as:

$$f_5^d: \sum_{i=1}^{|Q|} x_i \cdot (\psi_0(q_i) \cap (W_J) \neq \emptyset),$$

with $x_i$ representing a set of Boolean variables corresponding to an $i^{th}$ question.

Sometimes, in an assessment, it may be needed to change the relative importance of any of the additive components. Accordingly, in an embodiment of the present disclosure, the objective function to be maximized is a weighted sum of a plurality of additive components subject to one or more constraints, wherein weights associated with one or more of the plurality of additive components are configured to change relative importance associated with a corresponding additive component.

In an embodiment of the present disclosure, the one or more hardware processors 104, are configured to compute, at step 314, a solution to an Integer Linear Programming (ILP) formulation comprising the formulated objective function and the one or more constraints, the solution being in the form a bit array having a size corresponding to a number of questions in the predefined question bank. In an embodiment, a Linear Program solver such as a COIN-Ohl Branch and Cut (CBC) solver in Python linear programming (PULP) Application Programming Interface (API) is used.

The vector (bit array) is a combination of 0's and 1's, wherein the questions in the predefined question bank corresponding to the 1's in the vector form the questions to be selected as part of the personalized optimal questionnaire. Accordingly, in an embodiment of the present disclosure, the one or more hardware processors 104, are configured to generate, at step 316, a personalized optimal questionnaire, for the candidate, the personalized optimal questionnaire comprising an optimal set of questions from the predefined question bank, corresponding to a 1-bit in the bit array, and satisfying one or more criteria, each of the one or more criteria being the additive component of the objective function subject to the one or more constraints.

EXPERIMENTAL RESULTS

Baselines: To compare against the Integer Linear Programming (ILP) formulation-based method of the present disclosure, the following baselines for selecting questions for a candidate having resume R were used:
Baseline 1 for resume, BR1: Select $n_q$ questions randomly from $QB_s$, where $n_q$ is same as the number of questions in the optimal set.
Baseline 2 for resume, BR2: Let $F_R(s)$ denote the set of concepts related to skill s mentioned in the resume R. Select $n_q$ questions randomly from $QB_s$, where coverage of each selected question q has at least one concept common with the neighborhood of the set of concepts $F_R(s)$, i.e. $\psi(q) \cap \phi F_R(s) \neq \emptyset$.
Baseline 3 for resume, BR3: same as BR2 but ensures even distribution of difficulty level of the questions.
DuerQuiz (Qin et al., 2019): Since no implementation is publicly available, an in house version of this baseline was implemented. Since historical resumes or skill graph edge labels are not used in the method of the present disclosure, the QuerQuiz method was adapted in a best possible manner. The terms corresponding to historical resumes were ignored when assigning weights to concepts. Further, descendants of the concepts as direct neighbors in the skill graph were approximated, both for weight initialization and weight propagation.
Mixed Integer Programming (MIP): The method of the present disclosure is represented as MIP and the following weights and hyper-parameters were used:
=100, $w_2$=100, $W_3$=100, $w_4$=30, =70, $w_5$=30, $w_5^d$=70, $m_0$=0.3, $m_1$=0.4, $m_z$=03, $h_0$=0.9 and T=45. The weights were not fine-tuned, aside for T for controlling the number of recommended questions. For DuerQuiz, there was no thumb rule for setting hyper-parameters. A dissipation hyper-parameter or propagation weight $\alpha_c$=0.85 was set by hand-tuning on one resume and a smoothing weight $\beta_f$=0.001 was further set.

All experiments were performed on an Ubuntu 18.04.5 LTB machine with 8-core Intel™ i7-8550U 1.80 GHz processors, and 16 GB memory. For MIP, generation of questions with 45 min time budget (25 questions) takes 155 secs on an average. Comparison of the MIP method has been done with baselines BR1, BR3 (stronger version than BR2) and the DuerQuiz method.

Dataset: A skill graph of 714 concepts and 903 edges (average degree 2.51) for two skills Machine Learning and Deep Learning was used. A degree of a vertex (here concept) in a graph is the number of edges it is linked to. So average degree of a graph is about all the vertices in it. A question bank of 549 questions associated with the two skills was used. Each question was annotated with concepts from the skill graph (1.18 concepts per question on an average). Finally, resumes of 40 candidates (mostly fresh Information Technology graduates) who were actually interviewed were used. The skill graph concepts associated with the resumes (4.7 concepts per resume on an average) were identified. For 20 of the candidates, actual questions asked during the interviews ere obtained. Of these, only the questions related to the two skills under consideration were used. The average number of questions per candidate is 5.05.

Figure 6:
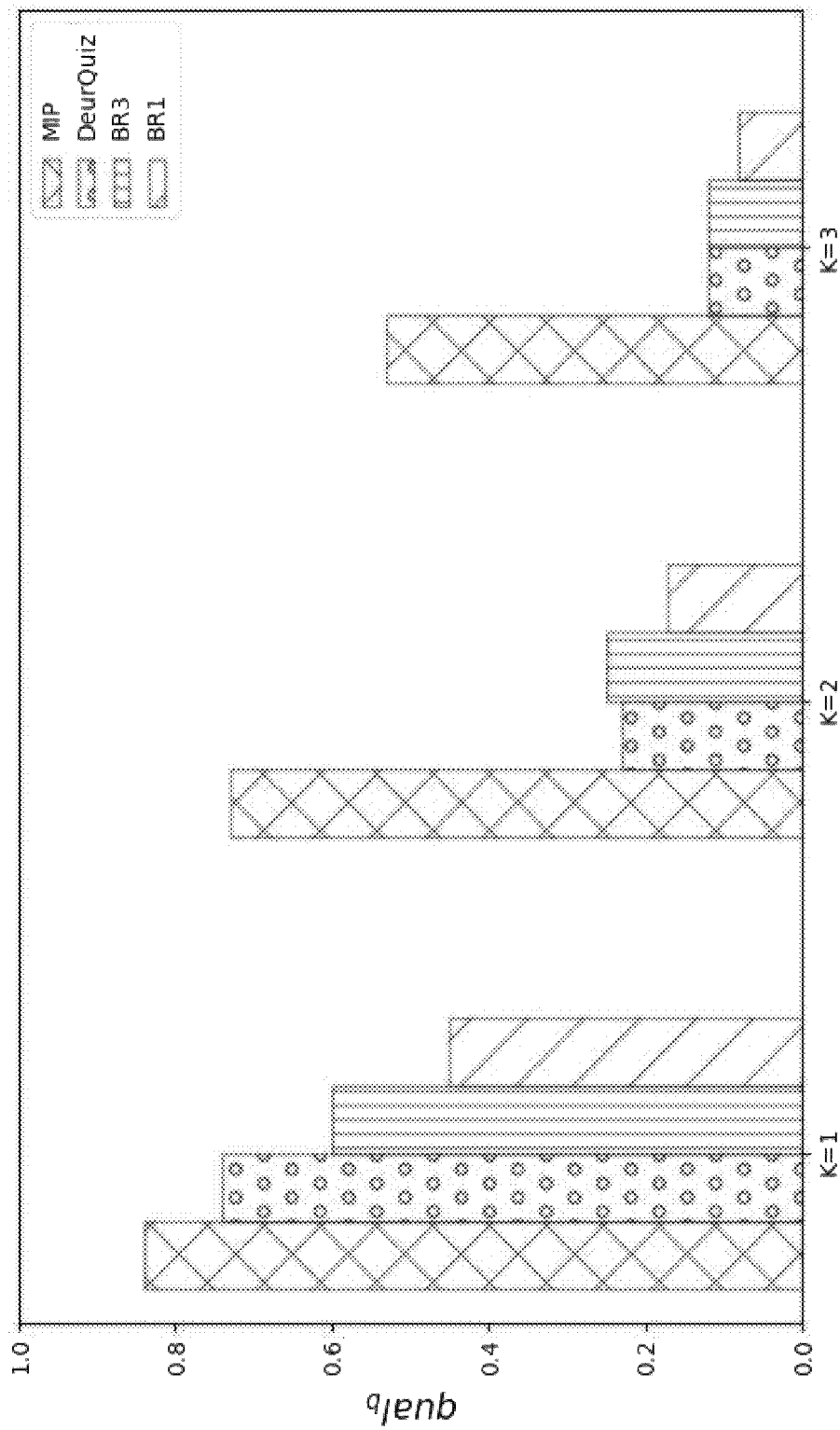
FIG. 6 and FIG. 7 illustrate backward and forward intrinsic evaluations, respectively, of the method of the present disclosure when compared with DuerQuiz method, baseline 3 for resume (BR3) and baseline 1 for resume (BR1).
Figure 7:
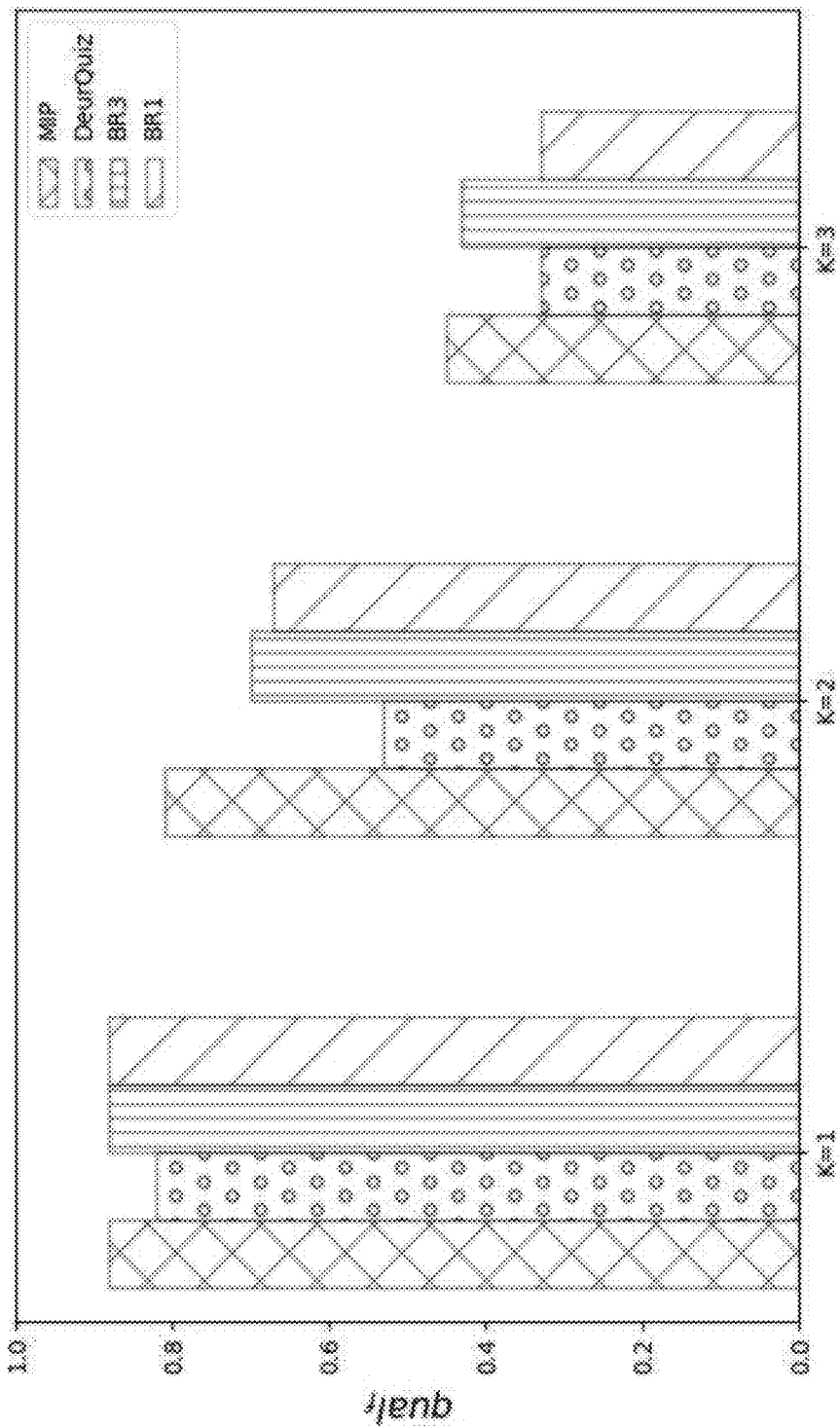

Intrinsic evaluation on actual interviews: In a first evaluation, the set of suggested questions with the set of actually asked questions was compared. FIG. 6 and FIG. 7 illustrate backward and forward intrinsic evaluations, respectively, of the method of the present disclosure (MIP) when compared with DuerQuiz method, baseline 3 for resume (BR3) and baseline 1 for resume (BR1), As seen from FIG. 6 and FIG. 7, the method of the present disclosure referenced as MIP performs better than all the three baselines in both evaluations and for different values of K representing the number of concepts common between two questions in the generated set and the actually asked questions set respectively. The differences are marked for backward evaluation. The improvement against BR1 shows the importance of focusing on the resume, rather than randomly selecting questions related to the skill. The improvement against BR3 shows that just focusing on questions related to the resume is not enough. Finally, the improvement against DuerQuiz, which combines aspects of both BR1 and BR3, shows the importance of the additional considerations (additive components described above) in the objective function of the present disclosure. Also, the analysis shows that DuerQuiz is poor at balancing between high-degree and low-degree concepts in the knowledge graph. Depending on the value of the dissipation hyper-parameter $\alpha_c$, it either transfers all the weight of high-degree concepts to their neighbors or does not transfer any weight from low-degree concepts to their neighbors. The trade-off in the MIP method using the different additive components and their corresponding weights works much better. It is further noted that the BR1 and the BR3 methods perform better than DuerQuiz in terms of forward evaluation, which indicates that these generate fewer irrelevant questions. On the other hand, DuerQuiz is better than these baselines in terms of backward evaluation. This indicates that the questions generated by these baselines are more heterogeneous and lack diversity when compared against DuerQuiz to cover all questions asked during an actual interview. The MIP method of the present disclosure outperforms DuerQuiz in both directions.

In a second evaluation, the questionnaire generated using pairs of the methods (MIP-BR1, MIP-BR3, MIP-DuerQuiz) mentioned above were compared by three experienced human interviewers. The questionnaire was distributed randomly to each of the 20 candidates, for e.g. 7 candidates got the pair MIP-BR1, and so on. For each candidate, two sets of questions were generated, each for the skill Machine Learning, using the method pair assigned. The two sets of questions were then presented to each of the 3 reviewers along with skills extracted from the resumes, without disclosing the method pair used. For each candidate, each human interviewer gave a comparative ranking, indicating whether set 1 was better than set 2. Each human interviewer used his/her own intuition for the comparison.

There were 7*3-21 evaluations of MIP-BR1 pair, where MP did well in 19 evaluations. Using $X^2$ test with 99.9% confidence, the null hypothesis was rejected, and it was concluded that MIP performed better than BR1. Similarly, MIP performed better than BR3 in 14 evaluations. Hence, MIP performed better than the relatively simpler methods BR1 and BR3. However, MIP performed better than Duer-Quiz in only 6 evaluations. There was a large disagreement amongst the human interviewers and the discussions showed that the human evaluation criteria was considerably simpler than the objective functions used in MIR For instance, none of the human interviewers considered the inter-linking of the questions in the evaluation, nor did they consider duplication of questions across different candidates as undesirable (not personalized); but these are important factors in MIP for selecting questions.

Thus it is seen from the experimental validations, that the method of the present disclosure ensures the quality of output of the system 100 using the method 300 is improved when compared to state-of-the-art methods and facilitates selection of an optimal set of technical questions, from a question bank, personalized for a candidate in an automatic and objective manner. This ensures consistent, standardized, efficient and objective interviews that result in high quality recruitment, given the diversity of candidates, complexity of job requirements and the fact that interviews are inherently subjective.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more hardware processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for integer linear programming-based generation of a personalized optimal questionnaire using a skill graph, wherein the method comprising the steps of:
  receiving, via one or more hardware processors, input data comprising:
    (i) a resume associated with a candidate, the resume comprising a first set of skills, each skill in the first set of skills being associated with a first set of concepts, (ii) a job description comprising a second set of skills, each skill in the second set of skills being associated with a second set of concepts, (iii) a skill graph pertaining to each skill in the second set of skills, wherein each concept in the second set of concepts serves as a node in the skill graph and edges connect each node to a semantically related one or more concepts in the second set of concepts, (iv) a predefined question bank comprising a plurality of questions pertaining to each skill in the second set of skills, each question in the plurality of questions being mapped to (a) one or more concepts from the second set of concepts and (b) an associated difficulty level being one of easy, medium and hard, (v) a difficulty level proportion configured to define number of questions from the predefined question bank corresponding to each difficulty level, (vi) a proficiency level corresponding to each skill in the second set of skills, and (vii) a time budget allotted for an assessment of the candidate;

computing, via the one or more hardware processors, a coverage of each question in the predefined question bank as a union of (i) the one or more concepts from the second set of concepts directly mapped to each question in the predefined question bank and (ii) one or more concepts from the second set of concepts that are neighbors, in the skill graph, of the directly mapped one or more concepts, the neighbors being the one or more concepts that are semantically related to each other, wherein the skill graph is employed to create a semantic characterization of questions in terms of the second set of concepts;

generating, via the one or more hardware processors, a question graph corresponding to the predefined question bank, the question graph having vertices corresponding to each question in the predefined question bank and edges connecting a pair of vertices if the corresponding questions share at least one concept from the second set of concepts, thereby representing related questions, while questions from the predefined question bank that do not share a concept represent unrelated questions;

computing, via the one or more hardware processors, a coverage of the resume as a union of (i) the first set of concepts and (ii) one or more concepts that are neighbors, in the skill graph, of the concepts from the first set of concepts;

computing, via the one or more hardware processors, a coverage of the job description as a union of (i) the second set of concepts and (ii) one or more concepts that are neighbors, in the skill graph of the concepts from the second set of concepts, and using an initializer stage to be run before invoking a CRUMBTRAIL as a pruner and wherein an initializer augments with concepts from vertices of a larger knowledge graph that are at most k-hops away from the category hierarchy in the skill graph and an augmented positive seed set along with the larger knowledge graph is provided as input to the CRUMBTRAIL; traversing, via the one or more hardware processors, concepts from one or more leaf concepts to a layer containing one or more intermediate concepts and searching paths that connect the one or more intermediate concepts to the one or more leaf concepts and unifying these one or more paths to construct the skill graph and wherein the edge set of the skill graph now contains only the category hierarchy relations;

post processing, via the one or more hardware processors by adding to a set relations of other types from the larger knowledge graph between one or more concepts already in a vertex set of the skill graph;

formulating, via the one or more hardware processors, an objective function to be maximized, the objective function representing a sum of a plurality of additive components subject to one or more constraints, wherein the objective function to be maximized is a weighted sum of a plurality of additive components subject to the one or more constraints, and wherein weights associated with one or more of the plurality of additive components are configured to change relative importance associated with a corresponding additive component;

computing, via the one or more hardware processors, a solution to an Integer Linear Programming (ILP) formulation comprising the formulated objective function and the one or more constraints, the solution being in the form a bit array having a size corresponding to a number of questions in the predefined question bank, wherein the solution is being computed using a Linear Program Solver, the linear program solver being a COIN-OR Branch or Cut solver in Python linear programming (PULP); and generating, via the one or more hardware processors, a personalized optimal questionnaire, for the candidate, the personalized optimal questionnaire comprising an optimal set of questions from the predefined question bank, corresponding to a 1-bit in the bit array, and satisfying one or more criteria, each of the one or more criteria being the additive component of the objective function subject to the one or more constraints, wherein the bit array is a combination of 0's and 1's and the optimal set of questions in the predefined question bank corresponding in a vector form are selected as part of the personalized optimal questionnaire.

2. The processor implemented method of claim 1, wherein the step of formulating an objective function to be maximized comprises:

formulating an additive component $f_1$ from the plurality of additive components, the additive component $f_1$ being configured to select questions from the predefined question bank having a maximum coverage of the concepts in the second set of concepts;

formulating an additive component $f_2$ from the plurality of additive components, the additive component $f_2$ being configured to select the related questions in the question graph;

formulating an additive component $f_3$ from the plurality of additive components, the additive component $f_3$ being configured to select the unrelated questions in the question graph;

formulating an additive component $f_4$ from the plurality of additive components, the additive component $f_4$ being configured to select questions having a coverage that shares one or more concepts in the first set of concepts by comparing the coverage of each question in the predefined question bank with the coverage of the resume;

formulating an additive component $f_5$ from the plurality of additive components, the additive component $f_5$ being configured to select questions having a coverage that shares one or more concepts in the second set of concepts by comparing the coverage of each question in the predefined question bank with the coverage of the job description;

formulating a constraint C1 configured to select questions such that time taken for responding to the personalized optimal questionnaire is less than or equal to the time budget allotted for the assessment;

formulating a constraint C2 configured to select number of questions associated with the difficulty level being easy, medium and hard, based on the difficulty level proportion; and formulating a constraint C3 configured to select the number of questions, from the predefined question bank corresponding to each difficulty level on the proficiency level.

3. The processor implemented method of claim 2, wherein the additive component $f_1$ is represented as:

$$f_1: \sum_{i=1}^{|Q|} x_i \cdot |\psi(q_i)|,$$

with $\Psi(q_i)$ representing the coverage of a question $q_i$, $|Q|$ representing number of questions, pertaining to a skill, in the predefined question bank, and $x_i$ is a set of Boolean variables corresponding to an $i^{th}$ question, where $1 \leq i \leq |Q|$;

the additive component $f_2$ is represented as:

$$f_2: \sum_{i=1}^{|Q|} \sum_{j>i}^{|Q|} x_i \cdot x_j \cdot \text{is\_qgraph\_edge}(i, j),$$

with $x_j$ representing a set of Boolean variables corresponding to a $j^{th}$ question, $x_i$ representing a set of Boolean variables corresponding to an $i^{th}$ question, and qgraph_edge representing a function that returns a value 1 in the presence of an edge between the $i^{th}$ question and the $j^{th}$ question in the question graph;

the additive component $f_3$ is represented as:

$$f_3: \sum_{i=1}^{|Q|} \sum_{j>i}^{|Q|} x_i \cdot x_j \cdot \neg \text{is\_qgraph\_path}(x_i, x_j),$$

with $x_i$ representing a set of Boolean variables corresponding to an $i^{th}$ question, $x_j$ representing a set of Boolean variables corresponding to a $j^{th}$ question, and is_qgraph_path representing a function that returns a value 1 in the presence of a path between the $i^{th}$ question and the $j^{th}$ question in the question graph;

the additive component $f_4$ is represented as:

$$f_4: \sum_{i=1}^{|Q|} x_i \cdot (\psi(q_i) \cap \Phi(W_R) \neq \emptyset),$$

with $x_i$ representing a set of Boolean variables corresponding to an $i^{th}$ question, $W_R$ representing the first set of concepts and $\Phi(W_R)$ representing the coverage of the resume;

the additive component $f_5$ is represented as:

$$f_5: \sum_{i=1}^{|Q|} x_i \cdot (\psi(q_i) \cap \Phi(W_J) \neq \emptyset),$$

with $x_i$ representing a set of Boolean variables corresponding to an $i^{th}$ question, $W_J$ representing the second set of concepts and $\Phi(W_J)$ representing the coverage of the job description;

the constraint C1 is represented as:

$$C1: \sum_{i=1}^{|Q|} x_i \cdot T_{\delta(q_i)}(q_i) \leq T,$$

with $x_i$ representing a set of Boolean variables corresponding to an $i^{th}$ question, $\delta(q_i)$ representing the difficulty level associated with the question $q_i$, $T_{\delta(q_i)}$ representing time taken for responding to the question $q_i$ and T representing the time budget allotted for the assessment;

the constraint C2 is represented as:

$$C2(k): \sum_{i=1}^{|Q|} x_i \cdot (\delta(q_i) == k) \leq \left( m_k \cdot \left( \sum_{i=1}^{|Q|} x_i \right) \right),$$

with $x_i$ representing a set of Boolean variables corresponding to an $i^{th}$ question, k representing the difficulty level and $m_k$ representing the difficulty level proportion; and the constraint C3 is represented as:

$$C3: \sum_{i=1}^{|Q|} x_i \cdot \delta(q_i) \geq h_0 \cdot \sum_{i=1}^{|Q|} x_i,$$

with, $x_i$ representing a set of Boolean variables corresponding to an $i^{th}$ question and $h_0$ representing the proficiency level.

4. The processor implemented method of claim 3, further comprising:

formulating an additive component $f_4^d$ from the plurality of additive components, the additive component $f_4^d$ being configured to select questions directly mapped to the first set of concepts; and formulating an additive component $f_5^d$ from the plurality of additive components, the additive component $f_5^d$ being configured to select questions that directly map to the second set of concepts.

5. The processor implemented method of claim 4, wherein the additive component $f_4^d$ is represented as:

$$f_4^d: \sum_{i=1}^{|Q|} x_i \cdot (\psi_0(q_i) \cap (W_R) \neq \emptyset),$$

with $x_i$ representing a set of Boolean variables corresponding to an $i^{th}$ question, $\Psi_0(q_i)$ represents concepts directly related to the questions; and the additive component $f_5^d$ is represented as:

$$f_5^d : \sum_{i=1}^{|Q|} x_i \cdot (\psi_0(q_i) \cap (W_J) \neq \emptyset),$$

with $x_i$ representing a set of Boolean variables corresponding to an $i^{th}$ question.

6. A system for integer linear programming-based generation of a personalized optimal questionnaire using a skill graph, wherein the system comprising:
one or more data storage devices operatively coupled to one or more hardware processors and configured to store instructions for execution via the one or more hardware processors to:
  receive input data comprising:
    (i) a resume associated with a candidate, the resume comprising a first set of skills, each skill in the first set of skills being associated with a first set of concepts,
    (ii) a job description comprising a second set of skills, each skill in the second set of skills being associated with a second set of concepts,
    (iii) a skill graph pertaining to each skill in the second set of skills, wherein each concept in the second set of concepts serves as a node in the skill graph and edges connect each node to a semantically related one or more concepts in the second set of concepts,
    (iv) a predefined question bank comprising a plurality of questions pertaining to each skill in the second set of skills, each question in the plurality of questions being mapped to (a) one or more concepts from the second set of concepts and (b) an associated difficulty level being one of easy, medium and hard,
    (v) a difficulty level proportion configured to define number of questions from the predefined question bank corresponding to each difficulty level,
    (vi) a proficiency level corresponding to each skill in the second set of skills, and
    (vii) a time budget allotted for an assessment of the candidate;
  compute a coverage of each question in the predefined question bank as a union of (i) the one or more concepts from the second set of concepts directly mapped to each question in the predefined question bank and (ii) one or more concepts from the second set of concepts that are neighbors, in the skill graph, of the directly mapped one or more concepts, the neighbors being the one or more concepts that are semantically related to each other, wherein the skill graph is employed to create a semantic characterization of questions in terms of the second set of concepts;
  generate a question graph corresponding to the predefined question bank, the question graph having vertices corresponding to each question in the predefined question bank and edges connecting a pair of vertices if the corresponding questions share at least one concept from the second set of concepts, thereby representing related questions, while questions from the predefined question bank that do not share a concept represent unrelated questions;
  compute a coverage of the resume as a union of (i) the first set of concepts and (ii) one or more concepts that are neighbors, in the skill graph, of the concepts from the first set of concepts;
  compute a coverage of the job description as a union of (i) the second set of concepts and (ii) one or more concepts that are neighbors, in the skill graph of the concepts from the second set of concepts, and using an initializer stage to be run before invoking a CRUMBTRAIL as a pruner and wherein an initializer augments with concepts from vertices of a larger knowledge graph that are at most k-hops away from the category hierarchy in the skill graph and an augmented positive seed set along with the larger knowledge graph is provided as input to the CRUMBTRAIL; traversing, via the one or more hardware processors, concepts from one or more leaf concepts to a layer containing one or more intermediate concepts and searching paths that connect the one or more intermediate concepts to the one or more leaf concepts and unifying these one or more paths to construct the skill graph and wherein the edge set of the skill graph now contains only the category hierarchy relations;
  post process by adding to a set relations of other types from the larger knowledge graph between one or more concepts already in a vertex set of the skill graph;
  formulate an objective function to be maximized, the objective function representing a sum of a plurality of additive components subject to one or more constraints, wherein the objective function to be maximized is a weighted sum of a plurality of additive components subject to the one or more constraints, and wherein weights associated with one or more of the plurality of additive components are configured to change relative importance associated with a corresponding additive component;
  compute a solution to an Integer Linear Programming (ILP) formulation comprising the formulated objective function and the one or more constraints, the solution being in the form a bit array having a size corresponding to a number of questions in the predefined question bank, wherein the solution is being computed using a Linear Program Solver, the linear program solver being a COIN-OR Branch or Cut solver in Python linear programming (PULP); and
  generate a personalized optimal questionnaire, for the candidate, the personalized optimal questionnaire comprising an optimal set of questions from the predefined question bank, corresponding to a 1-bit in the bit array, and satisfying one or more criteria, each of the one or more criteria being the additive component of the objective function subject to the one or more constraints, wherein the bit array is a combination of 0's and 1's and the optimal set of questions in the predefined question bank corresponding in a vector form are selected as part of the personalized optimal questionnaire.

7. The system of claim 6, wherein the one or more processors are configured by the instructions to formulate the objective function to be maximized by:
  formulating an additive component $f_1$ from the plurality of additive components, the additive component $f_1$ being configured to select questions from the predefined question bank having a maximum coverage of the concepts in the second set of concepts;
  formulating an additive component $f_2$ from the plurality of additive components, the additive component $f_2$ being configured to select the related questions in the question graph;

formulating an additive component $f_3$ from the plurality of additive components, the additive component $f_3$ being configured to select the unrelated questions in the question graph;

formulating an additive component $f_4$ from the plurality of additive components, the additive component $f_4$ being configured to select questions having a coverage that shares one or more concepts in the first set of concepts by comparing the coverage of each question in the predefined question bank with the coverage of the resume;

formulating an additive component $f_5$ from the plurality of additive components, the additive component $f_5$ being configured to select questions having a coverage that shares one or more concepts in the second set of concepts by comparing the coverage of each question in the predefined question bank with the coverage of the job description;

formulating a constraint C1 configured to select questions such that time taken for responding to the personalized optimal questionnaire is less than or equal to the time budget allotted for the assessment;

formulating a constraint C2 configured to select number of questions associated with the difficulty level being easy, medium and hard, based on the difficulty level proportion; and formulating a constraint C3 configured to select the number of questions, from the predefined question bank corresponding to each difficulty level on the proficiency level.

8. The system of claim 7, wherein the additive component $f_1$ is represented as:

$$f_1: \sum_{i=1}^{|Q|} x_i \cdot |\psi(q_i)|,$$

with $\Psi(q_i)$ representing the coverage of a question $q_i$, $|Q|$ representing number of questions, pertaining to a skill, in the predefined question bank, and $x_i$ is a set of Boolean variables corresponding to an $i^{th}$ question, where $1 \leq i \leq |Q|$;

the additive component $f_2$ is represented as:

$$f_2: \sum_{i=1}^{|Q|} \sum_{j>i}^{|Q|} x_i \cdot x_j \cdot \text{is\_qgraph\_edge}\,(i, j),$$

with $x_j$ is a set of Boolean variables corresponding to a $j^{th}$ question, $x_i$ representing a set of Boolean variables corresponding to an $i^{th}$ question, and qgraph_edge representing a function that returns a value 1 in the presence of an edge between the $i^{th}$ question and the $j^{th}$ question in the question graph;

the additive component $f_3$ is represented as:

$$f_3: \sum_{i=1}^{|Q|} \sum_{j>i}^{|Q|} x_i \cdot x_j \cdot \neg\, \text{is\_qgraph\_path}\,(x_i, x_j),$$

with $x_i$ representing a set of Boolean variables corresponding to an $i^{th}$ question, $x_j$ representing a set of Boolean variables corresponding to a $j^{th}$ question, and is_qgraph_path representing a function that returns a value 1 in the presence of a path between the $i^{th}$ question and the $j^{th}$ question in the question graph;

the additive component $f_4$ is represented as:

$$f_4: \sum_{i=1}^{|Q|} x_i \cdot (\psi(q_i) \cap \Phi(W_R) \neq \emptyset),$$

with $x_i$ representing a set of Boolean variables corresponding to an $i^{th}$ question, $W_R$ representing the first set of concepts and $\Phi(W_R)$ representing the coverage of the resume;

the additive component $f_5$ is represented as:

$$f_5: \sum_{i=1}^{|Q|} x_i \cdot (\psi(q_i) \cap \Phi(W_J) \neq \emptyset),$$

with $x_i$ representing a set of Boolean variables corresponding to an $i^{th}$ question, $W_J$ representing the second set of concepts and $\Phi(W_J)$ representing the coverage of the job description;

the constraint C1 is represented as:

$$C1: \sum_{i=1}^{|Q|} x_i \cdot T_{\delta(q_i)}(q_i) \leq T,$$

with $x_i$ representing a set of Boolean variables corresponding to an $i^{th}$ question, $\delta(q_i)$ representing the difficulty level associated with the question qi, $T_{\delta(q_i)}$ representing time taken for responding to the question $q_i$ and T representing the time budget allotted for the assessment;

the constraint C2 is represented as:

$$C2(k): \sum_{i=1}^{|Q|} x_i \cdot (\delta(q_i) == k) \leq \left(m_k \cdot \left(\sum_{i=1}^{|Q|} x_i\right)\right),$$

with $x_i$ representing a set of Boolean variables corresponding to an $i^{th}$ question, k representing the difficulty level and mx representing the difficulty level proportion; and the constraint C3 is represented as:

$$C3: \sum_{i=1}^{|Q|} x_i \cdot \delta(q_i) \geq h_0 \cdot \sum_{i=1}^{|Q|} x_i,$$

with $x_i$ representing a set of Boolean variables corresponding to an $i^{th}$ question and $h_0$ representing the proficiency level.

9. The system of claim 8, wherein the one or more processors are configured by the instructions to formulate an additive component $f_4^d$ from the plurality of additive components, the additive component $f_4^d$ being configured to select questions directly mapped to the first set of concepts; and formulate an additive component $f_5^d$ from the plurality of additive components, the additive component $f_5^d$ being configured to select questions that directly map to the second set of concepts.

10. The system of claim 9, wherein the additive component $f_4^d$ is represented as:

$$f_4^d : \sum_{i=1}^{|Q|} x_i \cdot (\psi_0(q_i) \cap (W_R) \neq \emptyset),$$

with $x_i$ representing a set of Boolean variables corresponding to an $i^{th}$ question, and $\Psi_0(q_i)$ represents concepts directly related to the questions; and
the additive component $f_5^d$ is represent as:

$$f_5^d : \sum_{i=1}^{|Q|} x_i \cdot (\psi_0(q_i) \cap (W_J) \neq \emptyset),$$

with $x_i$ representing a set of Boolean variables corresponding to an $i^{th}$ question.

11. One or more non-transitory machine-readable information storage mediums comprising one or more instructions which when executed by one or more hardware processors cause:
receiving, via the one or more hardware processors, input data comprising:
(i) a resume associated with a candidate, the resume comprising a first set of skills, each skill in the first set of skills being associated with a first set of concepts,
(ii) a job description comprising a second set of skills, each skill in the second set of skills being associated with a second set of concepts,
(iii) a skill graph pertaining to each skill in the second set of skills, wherein each concept in the second set of concepts serves as a node in the skill graph and edges connect each node to a semantically related one or more concepts in the second set of concepts,
(iv) a predefined question bank comprising a plurality of questions pertaining to each skill in the second set of skills, each question in the plurality of questions being mapped to (a) one or more concepts from the second set of concepts and (b) an associated difficulty level being one of easy, medium and hard,
(v) a difficulty level proportion configured to define number of questions from the predefined question bank corresponding to each difficulty level,
(vi) a proficiency level corresponding to each skill in the second set of skills, and
(vii) a time budget allotted for an assessment of the candidate;
computing, via the one or more hardware processors, a coverage of each question in the predefined question bank as a union of (i) the one or more concepts from the second set of concepts directly mapped to each question in the predefined question bank and (ii) one or more concepts from the second set of concepts that are neighbors, in the skill graph, of the directly mapped one or more concepts, the neighbors being the one or more concepts that are semantically related to each other, wherein the skill graph is employed to create a semantic characterization of questions in terms of the second set of concepts;
generating, via the one or more hardware processors, a question graph corresponding to the predefined question bank, the question graph having vertices corresponding to each question in the predefined question bank and edges connecting a pair of vertices if the corresponding questions share at least one concept from the second set of concepts, thereby representing related questions, while questions from the predefined question bank that do not share a concept represent unrelated questions;
computing, via the one or more hardware processors, a coverage of the resume as a union of (i) the first set of concepts and (ii) one or more concepts that are neighbors, in the skill graph, of the concepts from the first set of concepts;
computing, via the one or more hardware processors, a coverage of the job description as a union of (i) the second set of concepts and (ii) one or more concepts that are neighbors, in the skill graph of the concepts from the second set of concepts, and using an initializer stage to be run before invoking a CRUMBTRAIL as a pruner and wherein an initializer augments with concepts from vertices of a larger knowledge graph that are at most k-hops away from the category hierarchy in the skill graph and an augmented positive seed set along with the larger knowledge graph is provided as input to the CRUMBTRAIL; traversing, via the one or more hardware processors, concepts from one or more leaf concepts to a layer containing one or more intermediate concepts and searching paths that connect the one or more intermediate concepts to the one or more leaf concepts and unifying these one or more paths to construct the skill graph and wherein the edge set of the skill graph now contains only the category hierarchy relations;
post processing, via the one or more hardware processors by adding to a set relations of other types from the larger knowledge graph between one or more concepts already in a vertex set of the skill graph;
formulating, via the one or more hardware processors, an objective function to be maximized, the objective function representing a sum of a plurality of additive components subject to one or more constraints, wherein the objective function to be maximized is a weighted sum of a plurality of additive components subject to the one or more constraints, and wherein weights associated with one or more of the plurality of additive components are configured to change relative importance associated with a corresponding additive component;
computing, via the one or more hardware processors, a solution to an Integer Linear Programming (ILP) formulation comprising the formulated objective function and the one or more constraints, the solution being in the form a bit array having a size corresponding to a number of questions in the predefined question bank, wherein the solution is being computed using a Linear Program Solver, the linear program solver being a COIN-OR Branch or Cut solver in Python linear programming (PULP); and
generating, via the one or more hardware processors, a personalized optimal questionnaire, for the candidate, the personalized optimal questionnaire comprising an optimal set of questions from the predefined question bank, corresponding to a 1-bit in the bit array, and satisfying one or more criteria, each of the one or more criteria being the additive component of the objective function subject to the one or more constraints, wherein the bit array is a combination of 0's and 1's and the optimal set of questions in the predefined question bank corresponding in a vector form are selected as part of the personalized optimal questionnaire.

12. The one or more non-transitory machine-readable information storage mediums of claim 11, wherein the one or more instructions further cause formulating an objective function to be maximized by:
- formulating an additive component $f_1$ from the plurality of additive components, the additive component $f_1$ being configured to select questions from the predefined question bank having a maximum coverage of the concepts in the second set of concepts;
- formulating an additive component $f_2$ from the plurality of additive components, the additive component $f_2$ being configured to select the related questions in the question graph;
- formulating an additive component $f_3$ from the plurality of additive components, the additive component $f_3$ being configured to select the unrelated questions in the question graph;
- formulating an additive component $f_4$ from the plurality of additive components, the additive component $f_4$ being configured to select questions having a coverage that shares one or more concepts in the first set of concepts by comparing the coverage of each question in the predefined question bank with the coverage of the resume;
- formulating an additive component $f_5$ from the plurality of additive components, the additive component $f_5$ being configured to select questions having a coverage that shares one or more concepts in the second set of concepts by comparing the coverage of each question in the predefined question bank with the coverage of the job description;
- formulating a constraint C1 configured to select questions such that time taken for responding to the personalized optimal questionnaire is less than or equal to the time budget allotted for the assessment;
- formulating a constraint C2 configured to select number of questions associated with the difficulty level being easy, medium and hard, based on the difficulty level proportion; and
- formulating a constraint C3 configured to select the number of questions, from the predefined question bank corresponding to each difficulty level on the proficiency level.

13. The one or more non-transitory machine-readable information storage mediums of claim 12, wherein the additive component $f_1$ is represented as:

$$f_1 : \sum_{i=1}^{|Q|} x_i \cdot |\psi_0(q_i)|,$$

with $\Psi(q_i)$ representing the coverage of a question $q_i$, $|Q|$ representing number of questions, pertaining to a skill, in the predefined question bank, and $x_i$ is a set of Boolean variables corresponding to an $i^{th}$ question, where $1 \le i \le |Q|$;
the additive component $f_2$ is represented as:

$$f_2 : \sum_{i=1}^{|Q|} \sum_{j>1}^{|Q|} x_i \cdot x_j \cdot \text{is\_qgraph\_edge}(i, j),$$

with $x_j$ representing a set of Boolean variables corresponding to a $j^{th}$ question, $x_i$ representing a set of Boolean variables corresponding to an $i^{th}$ question, and qgraph_edge representing a function that returns a value 1 in the presence of an edge between the $i^{th}$ question and the $j^{th}$ question in the question graph;

the additive component $f_3$ is represented as:

$$f_3 : \sum_{i=1}^{|Q|} \sum_{j>1}^{|Q|} x_i \cdot x_j \cdot \neg \, \text{is\_qgraph\_path}(x_i, x_j),$$

with $x_i$ representing a set of Boolean variables corresponding to an $i^{th}$ question, $x_j$ representing a set of Boolean variables corresponding to a $j^{th}$ question, and is_qgraph_path representing a function that returns a value 1 in the presence of a path between the $i^{th}$ question and the $j^{th}$ question in the question graph;
the additive component $f_4$ is represented as:

$$f_4 : \sum_{i=1}^{|Q|} x_i \cdot (\psi(q_i) \cap \Phi(W_R) \ne \emptyset),$$

with $x_i$ representing a set of Boolean variables corresponding to an $i^{th}$ question, $W_R$ representing the first set of concepts and $\Phi(W_R)$ representing the coverage of the resume;
the additive component $f_5$ is represented as:

$$f_5 : \sum_{i=1}^{|Q|} x_i \cdot (\psi(q_i) \cap \Phi(W_J) \ne \emptyset),$$

with $x_i$ representing a set of Boolean variables corresponding to an $i^{th}$ question, $W_J$ representing the second set of concepts and $\Phi(W_J)$ representing the coverage of the job description;
the constraint C1 is represented as:

$$C1 : \sum_{i=1}^{|Q|} x_i \cdot T_{\delta(q_i)}(q_i) \le T,$$

with $x_i$ representing a set of Boolean variables corresponding to an $i^{th}$ question, $\delta(q_i)$ representing the difficulty level associated with the question $q_i$, $T_{\delta(q_i)}$ representing time taken for responding to the question $q_i$ and $T$ representing the time budget allotted for the assessment;
the constraint C2 is represented as:

$$C2(k) : \sum_{i=1}^{|Q|} x_i \cdot (\delta(q_i) == k) \le \left( m_k \cdot \left( \sum_{i=1}^{|Q|} x_i \right) \right),$$

with $x_i$ representing a set of Boolean variables corresponding to an $i^{th}$ question, k representing the difficulty level and mx representing the difficulty level proportion; and
the constraint C3 is represented as:

$$C3 : \sum_{i=1}^{|Q|} x_i \cdot \delta(q_i) \ge h_0 \cdot \sum_{i=1}^{|Q|} x_i,$$

with, $x_i$ representing a set of Boolean variables corresponding to an $i^{th}$ question and $h_0$ representing the proficiency level.

14. The one or more non-transitory machine-readable information storage mediums of claim 13, wherein the one or more instructions further cause:
formulating an additive component $f_4^d$ from the plurality of additive components, the additive component $f_4^d$ being configured to select questions directly mapped to the first set of concepts; and
formulating an additive component $f_5^d$ from the plurality of additive components, the additive component $f_5^d$ being configured to select questions that directly map to the second set of concepts.

15. The one or more non-transitory machine-readable information storage mediums of claim 14, wherein the additive component $f_4^d$ is represented as:

$$f_4^d : \sum_{i=1}^{|Q|} x_i \cdot (\psi_0(q_i) \cap (W_R) \neq \emptyset),$$

with $x_i$ representing a set of Boolean variables corresponding to an $i^{th}$ question, $\Psi_0(q_i)$ represents concepts directly related to the questions; and
the additive component $f_4^d$ is represented as:

$$f_5^d : \sum_{i=1}^{|Q|} x_i \cdot (\psi_0(q_i) \cap (W_J) \neq \emptyset),$$

with $x_i$ representing a set of Boolean variables corresponding to an $i^{th}$ question.

* * * * *